(12) United States Patent
Yajima et al.

(10) Patent No.: US 6,786,237 B2
(45) Date of Patent: Sep. 7, 2004

(54) AIR SERVO VALVE

(75) Inventors: Hisashi Yajima, Tsukuba-gun (JP);
Nobuhiro Fujiwara, Tsukuba-gun (JP);
Daisuke Matsumoto, Tsukuba-gun (JP);
Seikai Yo, Tsukuba-gun (JP); Hiroshi Miyachi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 33 days.

(21) Appl. No.: 10/294,626

(22) Filed: Nov. 15, 2002

(65) Prior Publication Data

US 2003/0131896 A1 Jul. 17, 2003

(30) Foreign Application Priority Data

Jan. 17, 2002 (JP) ........................................ 2002-008865

(51) Int. Cl.[7] ............................................ F15B 13/044
(52) U.S. Cl. ..................... 137/625.65; 137/554; 251/65
(58) Field of Search ........................... 137/554, 625.65; 251/65

(56) References Cited

U.S. PATENT DOCUMENTS 6,667,677 B2 * 12/2003 Yajima et al. .............. 335/229

* cited by examiner

*Primary Examiner*—Gerald A. Michalsky
(74) *Attorney, Agent, or Firm*—Oblon, Spivak, McClelland, Maier & Neustadt, P.C.

(57) ABSTRACT

An exciting coil is wound on a cylindrical yoke provided with a pair of pole teeth, a cylindrical permanent magnet where N pole and S pole are magnetized in a radial direction is disposed so as to be movable in a hollow portion of the yoke and the permanent magnet is coupled to a spool by a magnet holder, and a displacement sensor is disposed in a hollow portion of the permanent magnet so as to be positioned on a center axial line of the permanent magnet, so that the displacement of the permanent magnet is detected by the displacement sensor and the degree of opening of the spool is controlled by performing feedback of the displacement to a control portion.

20 Claims, 5 Drawing Sheets

AIR SERVO VALVE

TECHNICAL FIELD

The present invention relates to an air servo valve constituted so as to perform spool switching using an electromagnetic actuator of a magnet movable type as a drive source.

PRIOR ART

Conventionally, as an equipment for controlling fluid pressure supplied to a fluid pressure cylinder or the like, a switching valve of a spool type has been known. The switching valve of a spool type is constituted such that an electromagnet is used as a drive source for driving a spool and the spool is driven by a movable iron core of the electromagnet. However, such an electromagnet is suitable for a case that the spool is switched to two positions but it is unfit for a case that flow rate control is performed by performing feedback control on the operation position of a spool.

In view of the above, there is an example that, when flow rate control is performed by performing feedback control on the operation position of the spool, an electromagnetic actuator of a magnet movable type is used as a drive source, for example, such as described in JP-A 06-38486 publication. In this electromagnetic actuator, a rod-like permanent magnet is disposed in the interior of a coil wound in a cylindrical shape as a movable body, and the permanent magnet is caused to displace by interaction between flux generated by current flow to the coil and flux due to the permanent magnet so that spool switching is performed. Then, the operation position of the spool is detected by a displacement sensor and the electromagnetic actuator is feedback-controlled on the basis of a detection signal of the sensor so that flow rate control is performed.

However, since the above-described known electromagnetic actuator uses a rod-like permanent magnet as a movable body, there is a problem that a ratio of generated thrust/permanent magnet weight becomes small due to the size of the magnet and response is poor. Also, since N pole and S pole are magnetized in an axial direction of the permanent magnet, there is also a problem that the actuator is easily influenced by lateral load at a time of actuation thereof. Further, in case that flow rate control is performed by conducting feedback control on the operation position of the spool, when such a constitution is employed that the displacement of the permanent magnet is detected by a magnetic sensor, it is convenient because it is unnecessary to detect the displacement of the spool directly. However, since the flux density is not changed linearly, it is much difficult to detect the displacement of the permanent magnet accurately.

DISCLOSURE OF THE INVENTION

A technical object of the present invention is to solve the above-described conventional defect in an air serve valve using an electromagnetic actuator of a magnet movable type as a drive source for spool switching when a rod-like permanent magnet where N pole and S pole are magnetized in an axial direction is used as a movable body, and to constitute a air servo valve which is excellent in response and excellent in operation stability and which allows the displacement of a spool to be accurately detected via the movable body to enable flow rate control with a high precision.

In order to solve the above problem, an air servo valve according to the present invention comprises: a valve switching portion having a plurality of ports, a valve hole communicating with the ports, and a spool which is slidably inserted in the valve hole to switch flow paths among the ports; a driving portion having a cylindrical yoke provided with a pair of pole teeth opposed to each other, at least one exciting coil wound on the yoke, a cylindrical permanent magnet which is disposed in a hollow portion of the yoke movably in an axial direction of the yoke and where N pole and S pole are magnetized in a radial direction, and a magnet holder made of non-magnetic body, which couples the permanent magnet and the spool to each other; a displacement sensor which is disposed so as to position on a center axial line of the magnet inside the permanent magnet and detects the displacement of the permanent magnet from change of flux density; and a control portion which compares a detection signal from the displacement sensor with a set value to adjust a degree of valve opening by controlling the driving section on the basis of the deviation of the detection signal from the set value.

In the air servo valve having the above-described constitution, when the exciting coil is energized, one pole tooth of the yoke becomes N pole and the other pole tooth becomes S pole in response to the direction of the current. Then, when the magnetic pole generated in these pole teeth and the magnetic pole on the side of an outer periphery of the permanent magnet are different poles, an attracting force acts between these magnetic poles, but when they are the same pole, a repelling force acts therebetween. Therefore, the permanent magnet displaces in the axial direction due to these acting forces so that spool switching is performed. At this time, since the cylindrical permanent magnet is used as the movable body, the thrust relative to the weight of the movable body can be made larger as compared with the conventional article using the rod-like permanent magnet and the air servo valve of the present invention is superior to the conventional article in response.

On the other hand, the displacement of the permanent magnet is detected as the displacement of the spool by the displacement sensor, and the detection signal is fed back to the control circuit. Then, in this control circuit, the detection signal is compared with the set value, a control signal is outputted from the control circuit to the driving portion such that the deviation becomes zero, and the amount of displacement of the permanent magnet, namely, the amount of displacement of the spool is adjusted so that flow rate control is performed. At this time, since the flux density of the cylindrical permanent magnet which has been magnetized in the radial direction varies linearly on the center axial line, the displacement sensor is disposed so as to position on the center axial line within the hollow portion of the permanent magnet, so that the displacement of the permanent magnet can be detected accurately and flow rate control can be made with a high precision.

According to a preferred specific constitution aspect, the yoke comprises a cylindrical outer cylinder portion and a pair of inner cylinder portions which are concentric to the outer cylinder portion and are opposed to each other with a constant gap, the inner cylinder portions form the first pole tooth and the second pole tooth, and the exciting coil is accommodated in a space portion between the inner cylinder portions and the outer cylinder portion.

According to another specific constituent aspect of the present invention, the magnet holder is formed in a cylindrical shape and is accommodated in the hollow portion surrounded by the first pole tooth and the second tooth of the yoke so as to be capable of displacing in an axial direction, and the permanent magnet is fitted on an outer peripheral face of the magnet holder.

Also, in the present invention, a sensor holder extends from a cover covering an end portion of the yoke towards the inside of the permanent magnet in a center axial line of the permanent magnet, and the displacement sensor is held by the sensor holder.

Further, according to the present invention, such a constitution can be employed that a plurality of exciting coils wound in directions inverse to each other are arranged in the axial direction of he yoke and the magnitudes of currents flowing in respective exciting coils can be controlled individually.

With such a constitution, since the magnetic pole generated the first pole tooth and the second pole tooth of the yoke and the intensity thereof are determined according to the sum of magnetic fields generated by two exciting coils, the moving direction of the permanent magnet and the spool can be switched in forward and backward directions by only controlling the magnitudes of the currents individually without switching directions of currents flowing in two exciting coils forward and backward.

In the present invention, such a constitution is preferably employed that a current sensor for detecting current flowing in the exciting coil is provided and the coil current detected by the current sensor is fed back to the control portion so that a response delay of the coil current to the coil voltage is compensated for.

Also, in the present invention, a manual operating mechanism for switching the spool manually can be provided. The manual operating mechanism comprises a handle which is attached to a valve casing so as to be rotationally operable about an axial line of the handle itself, a pin which is provided at a distal end of the handle in an eccentric state, and an engaging groove which is formed the spool or the magnet holder to be engaged with the pin.

In the present invention, such a constitution is preferably employed that the spool is maintained in a neutral position at a time of non-excitation to the exciting coil. As means therefor, there is a method where the yoke is constituted so as not to be saturated magnetically by a magnetomotive force of the permanent magnet so that the magnetic saturation characteristic of the yoke is utilized, a method where return springs are provided on both ends of the spool, or the like.

DETAILED EXPLANATION

Figure 1:
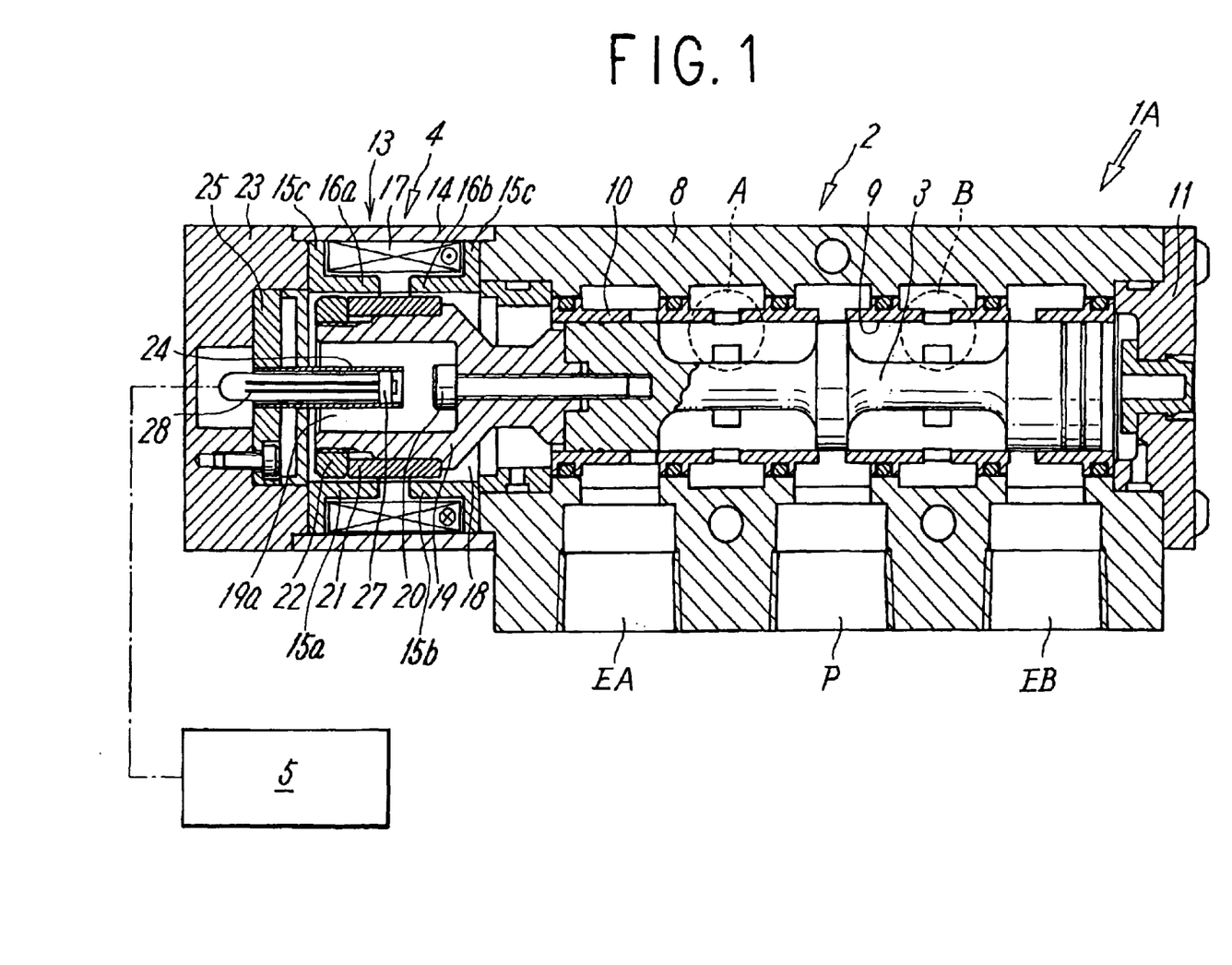
FIG. 1 is a sectional view showing a first embodiment of an air servo valve according to the present invention.

FIG. 1 shows a first embodiment of an air serve valve according to the present invention, where an air servo valve 1A comprises a valve switching portion 2 of a 5-port type which switches connection states of fluid flow paths of a spool 3, a driving portion 4 which is constituted so as to drive the spool 3 by an electromagnetic actuator, and a control portion 5 which performs feedback control on the driving portion 4.

The valve switching portion 2 has a casing 8 with a rectangular section, and a supply port P, two output ports A, B, two exhaust ports EA, EB, and a valve hole 9 are formed in this casing 8 with which the respective ports communicate. A sleeve 10 provided on a periphery with openings communicating with the respective ports is attached in this valve hole 9, and the spool 3 for switching flow paths among the respective ports is slidably accommodated in the sleeve 3. In the figure, reference numeral 11 denotes an end cover attached to one end of the casing 8.

Also, the driving portion 4 comprising an electromagnetic actuator is disposed at one end side of the valve switching portion 2 in an axial direction thereof, and has a cylindrical yoke 13 which is continuously connected to an end portion of the casing 8. This yoke 13 comprises a magnetic body, and has a cylindrical outer cylinder portion 14 and a pair of left and right inner cylinder portions 15a, 15b which are positioned in the interior of the outer cylinder portion 14 concentrically therewith. These inner cylinder portions 15a, 15b are opposed to each other via a constant gap positioned therebetween, thereby forming a first pole tooth 16a and a second pole tooth 16b. Also, flange portions 15c, 15c expanding outward are formed on axial outer end portions of the respective inner cylinder portions 15a, 15b, and outer peripheries of the flange portions 15c, 15c come in contact with an inner peripheral face of the outer cylinder portion at positions close to both axial end portions of the outer cylinder portion 14. A cylindrical exciting coil 17 wound on a bobbin is received in a space portion defined between the outer cylinder portion 14 and the inner cylinder portions 15a, 15b.

A cylindrical magnet holder 19 made of non-magnetic body, whose one axial end is opened is received in a space portion 18 whose outer periphery is surrounded by the first pole tooth 16a and the second pole tooth 16b of the yoke 13 such that the holder can displace in an axial direction thereof, and it is coupled to an end portion of the spool 3 by a screw 20. A cylindrical permanent magnet 21 where N pole and S pole are magnetized in a radial direction is fitted on an outer peripheral face of the magnet holder 19 in a state that the magnetic pole of the outer peripheral face of the permanent magnet has been opposed to both the pole teeth 16a, 16b, and the permanent magnet is fixed to the magnet holder 19 by a nut 22 screwed to an end portion of the magnet holder 19.

A preferred length of the permanent magnet 21 is a length spanned between the both pole teeth 16a, 16b. In particularly, it is preferable that the length is such a length that, even when the permanent magnet 21 has been moved to one stroke end, the other end of the permanent magnet 21 overlaps with the pole tooth on the reversed side or is close thereto with a small gap.

Also, the yoke 13 has such a magnetic saturation characteristic that magnetic saturation does not be caused by the magnetomotive force of the permanent magnet 21, so that the permanent magnet 21 stops at a position where magnetic resistances of magnetic paths which are respectively formed between the permanent magnet 21 and the first pole tooth 16a and between the permanent magnet 21 and the second pole tooth 16b become equal to each other, namely at an intermediate position at a time of non-current flow to the exciting coil 17.

An end cover 23 is attached to an end portion of the yoke 13, and a supporting member 25 is fixed to an inner face of the end cover 23 and a cylindrical sensor holder 24 is provided at a central portion of the supporting member 25 so as to extend into a hollow portion 19a of the magnet holder 19, and a displacement sensor 27 for detecting the displacement of the permanent magnet 21 is attached to a distal end portion of the sensor holder 24. This displacement sensor 27 comprises a Hall element, an MR element or the like, and is for detecting flux density generated from the permanent magnet 21 to detect the displacement of the permanent magnet 21 from change of the flux density as the displacement of the spool 3. In this case, in order to detect the displacement of the permanent magnet 21 with a high precision, the displacement sensor 27 is disposed within the hollow portion of the cylindrical permanent magnet 21 so as to be positioned on a center axial line of the permanent magnet. This is directed for effectively utilizing such a property that the flux density of the cylindrical permanent magnet 21 magnetized in the radial direction changes linearly on the center axial line, and it is first made possible to dispose the displacement sensor 27 on the center axial line by using such a cylindrical permanent magnet 21 as the movable body, so that it becomes possible to detect the displacement of the permanent magnet 21 with a high precision.

Figure 2:
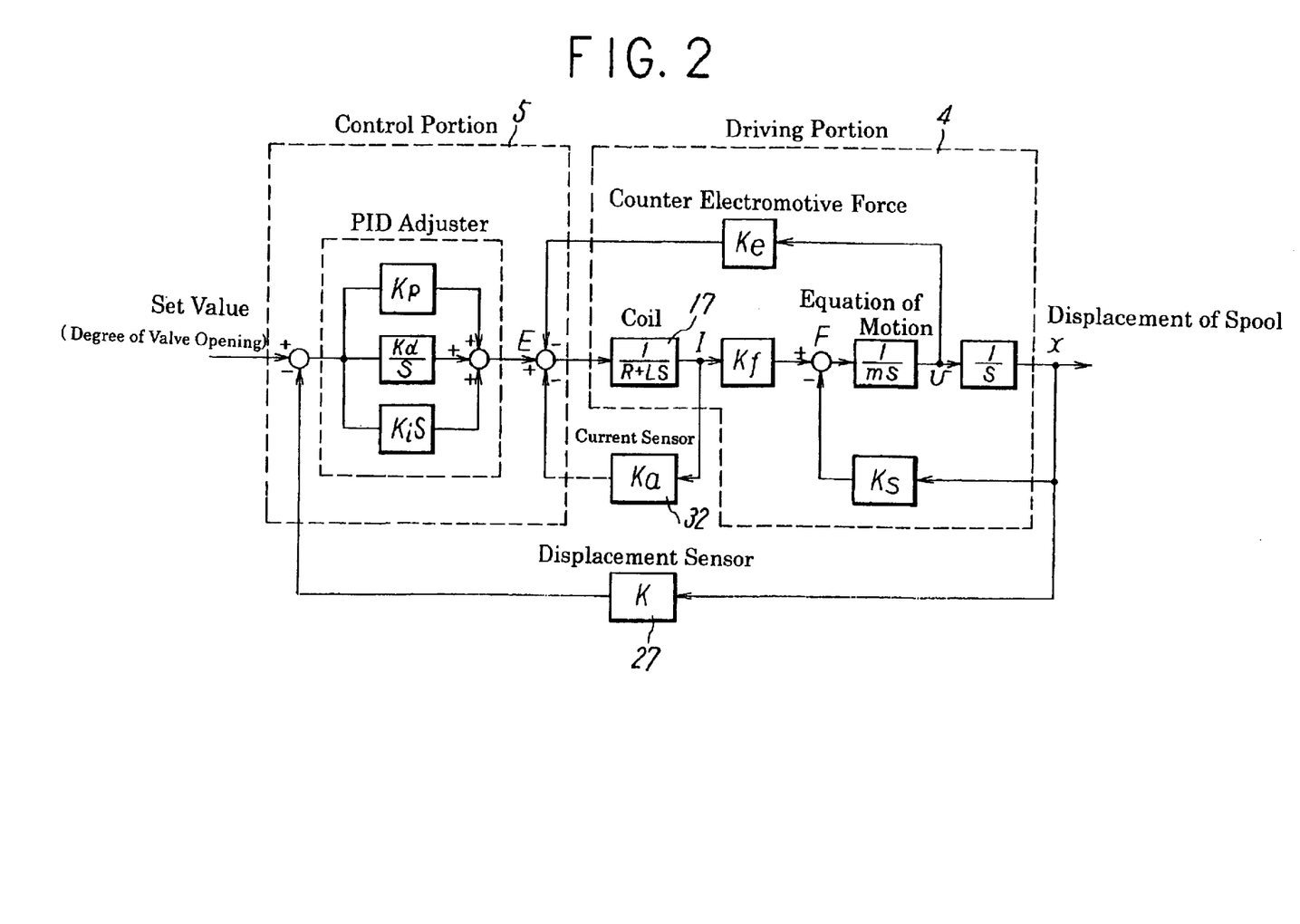
FIG. 2 is an explanatory diagram of a control system for feedback control.

The displacement sensor 27 is connected to the control portion 5 by lead wires 28 extending in the interior of the sensor holder 24. This control portion 5 is for adjusting the opening degree of the spool 3 by performing feedback control on the driving portion 4. In FIG. 2, a state that the control portion 5, and the driving portion 4 and the displacement sensor 27 have been connected to each other is shown with symbols. In the same figure, when a set value about the opening degree of the spool 3 is inputted into the control portion 5, a voltage E corresponding to the set value is applied to the exciting coil 17 of the driving portion 4 via a PID adjuster. At this time, since current I corresponding to a resistance R and an inductance L flows in the exciting coil 17 to generate a magnetic force, a thrust F corresponding to a thrust constant Kf is generated in the permanent magnet 21 due to an interaction with the magnetic force of the permanent magnet 21 so that the permanent magnet 21 moves at a velocity V based upon an equation of motion 1/ms due to this thrust F.

The displacement of the permanent magnet 21 is detected by the displacement sensor 27 as a displacement x of the spool 3, and its detection signal is fed back to the control portion 5, where the signal is compared with a set value about a preset degree of valve opening. Then, a control signal is outputted from the control portion 5 to the driving portion 4 such that the deviation between the set valve and the signal becomes zero, and the amount of displacement of the permanent magnet 21 is controlled so that the degree of valve opening following the displacement of the spool 3 is adjusted and thereby flow rate control is conducted. For example, when the displacement of the spool 3 has not reached the set value, a positive voltage corresponding to a difference therebetween is applied to the exciting coil 17 so that a thrust is generated such that the spool 3 displaces in a direction approaching to the set value. On the contrary, when the displacement of the spool 3 has exceeded the set value, a negative voltage corresponding to a difference therebetween is applied to the exciting coil 17 so that a thrust is generated in a direction where the spool 3 approaches to the set value. Also, when the displacement of the spool 3 has been coincident with the set value, the voltage applied to the exciting coil 17 becomes zero, so that a thrust is not generated.

Also, such a constitution is employed that a current sensor 32 for detecting current flowing in the exciting coil 17 is connected to the control portion 5, and a response delay of a coil current to a coil voltage is compensated for by feeding back a detection signal from the current sensor 32. Thereby, the response can be improved.

Incidentally, among the symbols in FIG. 2, Kp expresses a proportional gain of the PID adjuster, Kd expresses a derivative gain thereof, Ki expresses an integral gain thereof, s expresses a Laplace operator, m expresses a mass of the movable portion including the permanent magnet, Ke expresses a counter electromotive force constant, Ks expresses a spring constant acting on the movable portion, Ka expresses a current feedback gain, and K expresses a displacement feedback gain, respectively.

In the air servo valve 1A of the first embodiment having the above-described constitution, as shown in FIG. 1, the permanent magnet 21 has been magnetized in a radial direction such that its outer peripheral side becomes N pole and its inner peripheral side becomes S pole. Also, since the permanent magnet 21 has such a magnetic saturation characteristic that the yoke 13 is not magnetically saturated by a magnetomotive force of the permanent magnet 21, the permanent magnet 21 stops at a position where magnetic resistances of magnetic paths formed between the permanent magnet 21 and the first pole tooth 16a and between the permanent magnet 21 and the second pole tooth 16b, respectively, are equal to each other, i.e., at an intermediate position at a time of non-current flow to the exciting coil 17. For this reason, the spool 3 also stops at a neutral position, where all of the flow paths among the respective ports P, A, B, EA, and EB have been blocked.

In this state, when current is caused to flow in the exciting coil 17 in a direction indicated with a symbol in FIG. 1, the first pole tooth 16a of the yoke 13 becomes N pole and the second pole tooth 16b becomes S pole according to the direction of the current. For this reason, since the permanent magnet 21 displaces on the side of second pole tooth 16b due to a magnetic attracting force and the spool 3 also displaces in a right direction in the figure according to the displacement of the magnet, the supply port P and the output port A communicate with each other and the output port B and the exhaust port EB communicate with each other.

When current is caused to flow in the exciting coil 17 in the reverse direction, the first pole tooth 16a of the yoke 13 becomes S pole and the second pole tooth 16b becomes N pole, so that the permanent magnet 21 displaces on the side of the first pole tooth 16a and the spool 3 also displaces in a left direction in the figure according to the displacement of the magnet. For this reason, the supply port P and the output port B communicate with each other, and the output port A and the exhaust port EA communicate with each other. Here, since the cylindrical permanent magnet 21 is used as the movable body in the control portion 5, the ratio of generation thrust/movable portion weight becomes larger as compared with the case that the rod-like permanent magnet 21 is used, so that the embodiment is superior in response to the case.

On the other hand, the displacement of the permanent magnet 21 is detected as the displacement of the spool 3 by the displacement sensor 27, and its detection signal is fed back to the control portion 5. Then, in this control portion 5, its detection signal is compared with the set value, a control signal is outputted from this control portion 5 to the driving portion 4 such that a deviation therebetween becomes zero, and the displacement amount of the permanent magnet 21 is controlled so that the degree of valve opening is adjusted and the flow rate control is performed thereby. At this time, since the displacement sensor 27 is disposed in the interior of the cylindrical permanent magnet 21 in the center axial line thereof, such a property that the flux density of the cylindrical permanent magnet 21 magnetized in the radial direction varies linearly in the center axial line is effectively utilized, so that the displacement of the permanent magnet 21 can be detected accurately and it becomes possible to perform a flow rate control with a high precision.

When current flow to the exiting coil 17 is stopped, since the permanent magnet 21 is positioned at an intermediate position between both the pole teeth 16a, 16b, the spool 3 also occupies a neutral position. Thus, by making such a setting that the spool 3 occupies the neutral position at a time of non-current flow to the exciting coil 17, the actuator such as an air cylinder put in a driving state by this air servo valve 1A stops at its position even in such a case that current flow to the exciting coil 17 stops due to occurrence of any abnormal state, so that safety is high.

Figure 3:
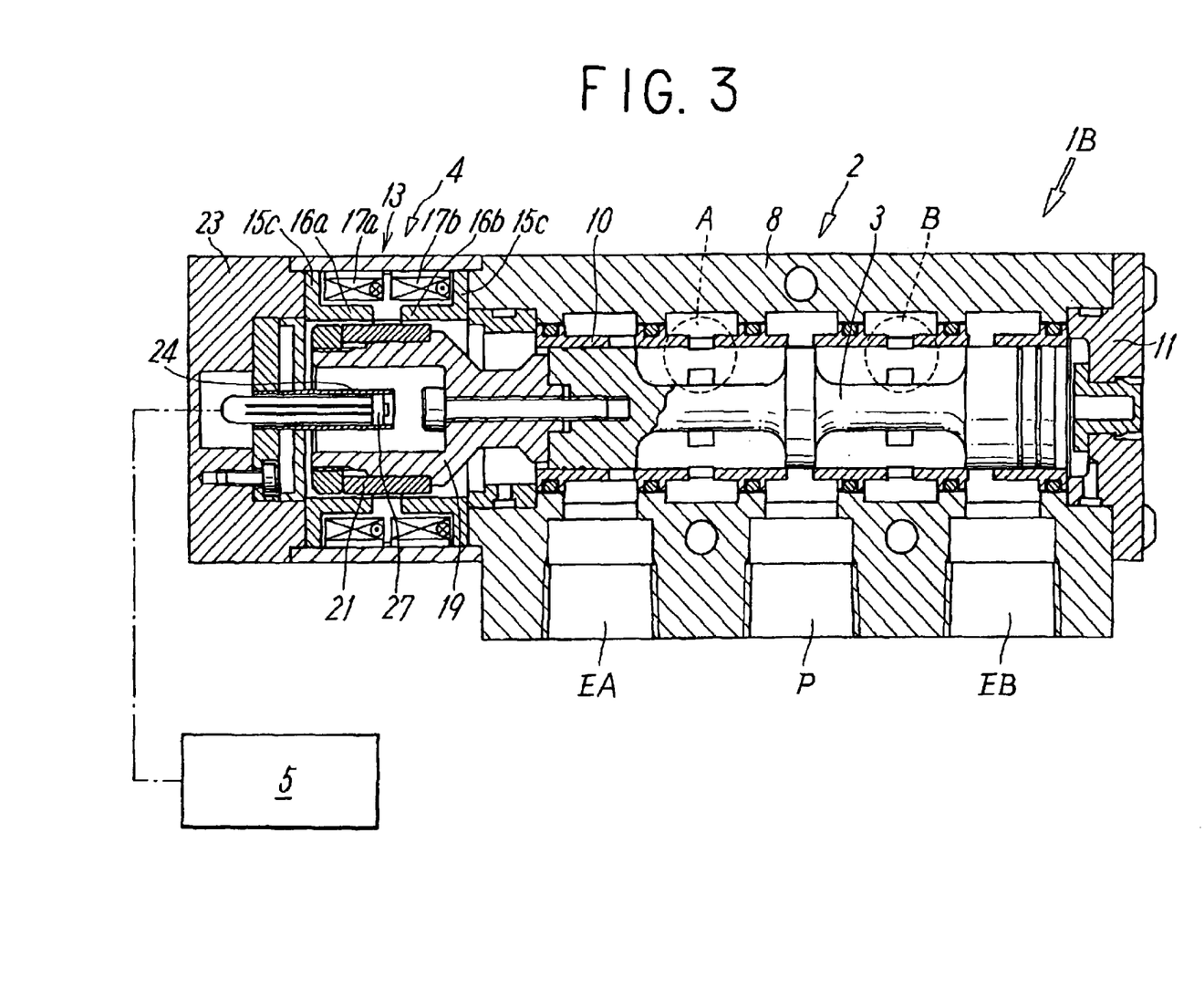
FIG. 3 is a sectional view showing a second embodiment of an air servo valve according to the present invention.

FIG. 3 shows a second embodiment of the present invention, and a point in which an air servo valve 1B of the second embodiment is different from the air servo valve 1A of the first embodiment lies in that the driving portion 4 is provided with a plurality of exciting coils 17a, 17b. That is, such a constitution is employed that the first exciting coil 17a and the second exciting coil 17b wound in directions reverse to each other is provided in a space portion of the yoke 13 along an axial direction thereof and the magnitudes of currents flowing in these exciting coils 17a, 17b can be controlled by the control portion 5 individually.

Since constitutions other than the above constitution of the air servo valve 1B are substantially the same as those of the air servo valve 1A of the first embodiment, main same constituent portions are attached with same reference numerals in the first embodiment and explanation thereof will be omitted.

In the above air servo valve 1B, the magnetic pole generated in the first pole tooth 16a and the second pole tooth 16b of the yoke 13 and its intensity are determined on the basis of the sum of magnetic fields generated by the above-described two exciting coils 17a, 17b. Accordingly, in case that current flowing in the first exciting coil 17a is larger than current flowing in the second exciting coil 17b, the first pole tooth 16a becomes S pole and the second pole tooth 16b becomes N pole. For this reason, the permanent magnet 21 displaces to the side of the first pole tooth 16a, and the spool 3 also displaces in the left direction in the figure according to the displacement of the magnet. On the contrary, when current flowing in the exciting coil 17b is larger than current flowing in the first exciting coil 17a, the first pole tooth 16a becomes N pole and the second pole tooth 16b becomes S pole, so that the permanent magnet 21 displaces on the side of the second pole tooth 16b and the spool 3 also displaces in the right direction in the figure according to the displacement of the magnet.

Accordingly, the moving direction of the permanent magnet 21 and the spool 3 can be switched forward and backward by only controlling the magnitudes of the currents flowing in the two exciting coils 17a, 17b individually without switching the directions of the currents forward and backward. This facilitates realization of a control circuit with a high performance whose constitution is simple and which is inexpensive.

Figure 4:
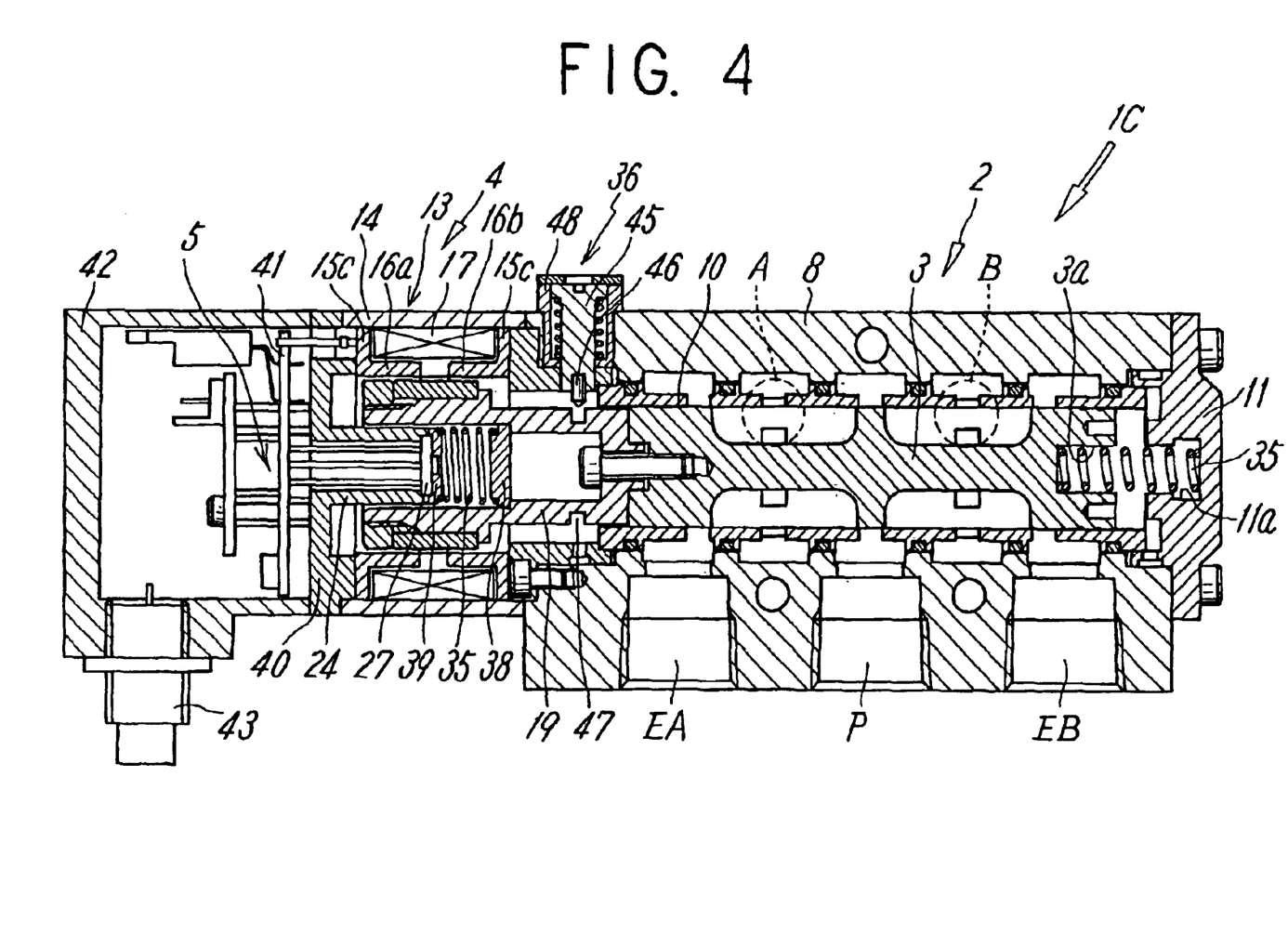
FIG. 4 is a sectional view showing a third embodiment of an air servo valve according to the present invention.
Figure 5:
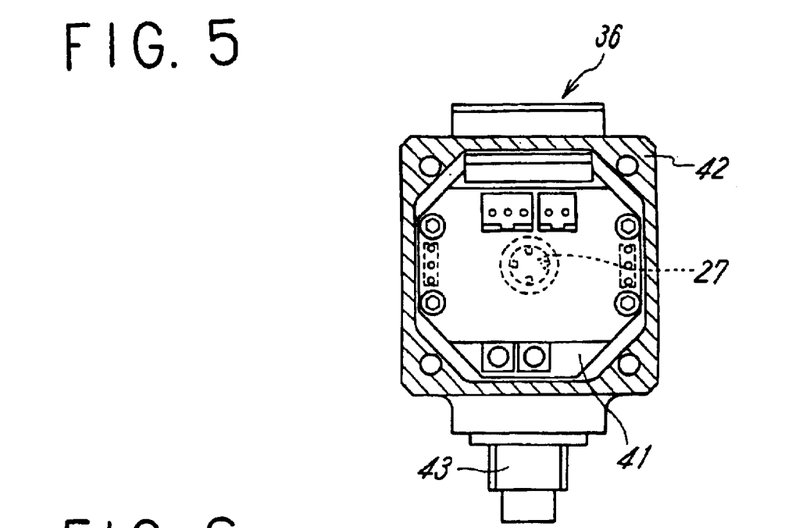
FIG. 5 is a sectional view in FIG. 4.

FIG. 4 and FIG. 5 show a third embodiment of the present invention, and points that an air servo valve 1C of the third embodiment is different from the air servo valve 1A of the first embodiment include a point that return springs 35, 35 are provided on both sides of the spool 3 so that the spool 3 is caused to be held at a neutral position by the return springs 35, 35 at a time of non-current flow, a point that a manual operating mechanism 36 for switching the spool 3 manually is provided, and a point that the control portion 5 is additionally provided at an end portion of the driving portion 4.

That is, on one end side of the spool 3, recessed portion 3a, 11a are respectively formed on an end face of the spool 3 and an end face of the end cover 11, and both ends of one return spring 35 are received in these recessed portions. Also, on the other end side of the spool 3, spring seats 38, 39 are respectively provided on the interior of the magnet holder 19 and a distal end portion of the cylindrical sensor holder 24, and the other return spring 35 is disposed between these spring seats 38, 39. Thereby, the spool 3 can be stopped at a neutral position more rapidly and more securely at a time of non-current flow to the exciting coil 17.

The above-described sensor holder 24 is formed integrally with a support member 40 covering an end face of the yoke 13, a base plate 41 is attached to an outer face of the support member 40, and the above-described control portion 5 is assembled on the base plate 41. Also, a cover 42 is attached to the support member 40, and the whole the base plate 41 is covered with the cover 42. In the figure, reference numeral 43 denotes a connector for supplying current to the control portion 5 of the base plate 41 and the other electronic components.

Figures 6, 7:
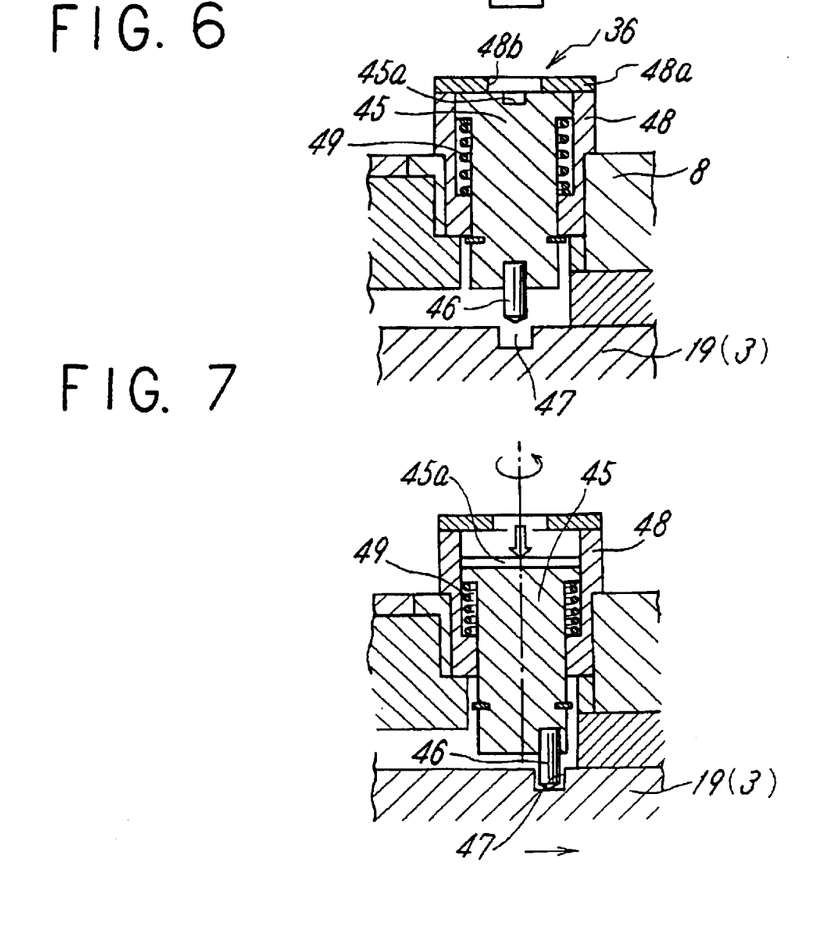
FIG. 6 is an enlarged view of a manual operating mechanism portion in FIG. 4.
FIG. 7 is an explanatory view for explaining an operation of the manual operating mechanism.

Also, as understood from FIG. 6, the above-described manual operating mechanism 36 comprises a round column-shape handle 45 attached to the casing 8 via a holder 48 such that it freely advances/retracts in a direction of an axial line thereof itself and is rotationally operable about the axial line, a pin 46 provided at a distal end of the handle 45 in an eccentric state, and an engagement groove 47 which is formed on a whole periphery of an outer face of the magnet holder 19 and is engaged with the pin 46. The handle 45 is always biased in a retracting direction by the spring 49 so that the pin 46 ordinarily occupies a return position out of the engagement groove 47. The handle 45 has at its head portion an operation groove 45a for rotationally operating the handle by such a tool as a screw driver or the like. Also, a protective cover 48a which covers the head portion of the handle 45 is attached to an upper portion of the holder 48, so that the handle 45 is prevented from being operated rotationally accidentally. In the figure, reference numeral 48b denotes a hole for operation provided in the protective cover 48a. Incidentally, the engagement groove 47 is provided in the magnetic holder 19, but it may be provided on the spool 3.

As shown in FIG. 7, when the spool 3 is caused to displace by the manual operating mechanism 36, such a tool as a screw driver or the like is inserted into the operation groove 45a of the handle 45 and the handle 45 is pushed in its axial line direction to cause the pin 46 at the distal end to engage the engagement groove 47, so that the handle 45 is rotated clockwise or counterclockwise by 90° in this state. Now, since the pin 46 eccentrically and rotationally moves about the axial line of the handle 45, the magnet holder 19 and thus the spool 3 is pushed by the pin 46 to displace. In FIG. 7, a case that, when the handle 45 is rotated in a counterclockwise direction, the spool 3 displaces in the right direction is shown. In this case, therefore, the spool 3 can be caused to displace in the left direction in the figure by rotating the handle 45 in the clockwise direction. Thus, the flow paths can be switched by causing the spool 3 to displace left or right manually at a time of service interruption or the like.

Incidentally, since constitutions and effects other than the above in the air servo valve 1C of the third embodiment are substantially the same as those in the air servo valve 1A of the first embodiment, main same constituent portions are attached with same reference numerals in the first embodiment, and explanation thereof will be omitted.

Also, in the air servo valve 1C of the above-described third embodiment, a plurality of the exciting coils 17 may be provided like the air servo valve 1B of the second embodiment. Alternately, such a constitution can be employed that one of the return springs 35, 35 and the manual operating mechanism 36 is omitted.

According to the air servo valve of the present invention, since the cylindrical permanent magnet is used as the movable body, the ratio of generation thrust/movable portion weight becomes larger and response is superior as compared with a conventional article using a rod-like permanent magnet.

Also, since the displacement sensor has been disposed within the hollow portion of the cylindrical permanent magnet so as to be positioned in the center axial line thereof, such a property that the flux density of the cylindrical permanent magnet magnetized in the radial direction varies linearly in the center axial line is effectively utilized so that the displacement of the permanent magnet can be detected with a high precision and an accurate flow rate control can be performed.

What is claimed is:

1. An air servo valve, comprising:
   a valve switching portion having a plurality of ports, a valve hole communicating with the ports, and a spool which is slidably inserted in the valve hole to switch flow paths among the ports;
   a driving portion having a cylindrical yoke provided with a pair of pole teeth opposed to each other, at least one exciting coil wound on the yoke, a cylindrical permanent magnet which is disposed in a hollow portion of the yoke movably in an axial direction of the yoke and where N pole and S pole are magnetized in a radial direction, and a magnet holder made of non-magnetic body, which couples the permanent magnet and the spool to each other;
   a displacement sensor which is disposed so as to position on a center axial line of the magnet inside the permanent magnet and detects the displacement of the permanent magnet from change of flux density; and
   a control portion which compares a detection signal from the displacement sensor with a set value to adjust a degree of valve opening by controlling the driving section on the basis of the deviation of the detection signal from the set value.

2. An air servo valve according to claim 1, wherein the yoke comprises a cylindrical outer cylinder portion and a pair of inner cylinder portions which are concentric to the outer cylinder portion and are opposed to each other with a constant gap, the inner cylinder portions form the first pole tooth and the second pole tooth, and the exciting coil is accommodated in a space portion between the inner cylinder portions and the outer cylinder portion.

3. An air servo valve according to claim 2, wherein the magnet holder is formed in a cylindrical shape and is accommodated in the hollow portion surrounded by the first pole tooth and the second tooth of the yoke so as to be capable of displacing in an axial direction, and the permanent magnet is fitted on an outer peripheral face of the magnet holder.

4. An air servo valve according to claim 1, wherein a sensor holder extends from a cover covering an end portion of the yoke towards the inside of the permanent magnet in a center axial line of the permanent magnet, and the displacement sensor is held by the sensor holder.

5. An air servo valve according to claim 1, wherein a plurality of the exciting coils having winding directions reverse to each other are provided, the exciting coils are arranged in parallel in an axial line direction of the yoke and the magnitudes of currents flowing in the respective exciting coils can be controlled individually.

6. An air servo valve according to claim 1, further comprising a current sensor for detecting current flowing in the exciting coil, wherein the coil current detected by the current sensor is fed back to the control portion so that a response delay of the coil current to the coil voltage is compensated for.

7. An air servo valve according to claim 1, further comprising a manual operating mechanism for switching the spool manually.

8. An air servo valve according to claim 7, wherein the manual operating mechanism comprises a handle attached to a casing so as to be rotationally operable about an axial line of the handle itself, a pin provided at a distal end of the handle in an eccentric state, and an engagement groove formed on the spool or the magnetic holder to be engaged with the pin.

9. An air servo valve according to claim 1, wherein the air servo valve is constituted such that the spool is held at a neutral position at a time of non-current flow to the exciting coil.

10. An air servo valve according to claim 9, wherein means for holding the spool at the neutral position is a magnetic saturation characteristic of the yoke, and the yoke is constituted so as not to be saturated by a magnetomotive force of the permanent of the permanent magnet.

11. An air servo valve according to claim 9, wherein means for holding the spool at the neutral position is return springs provided on both ends of the spool.

12. An air servo valve, comprising:
    a valve switching portion having a plurality of ports, a valve hole communicating with the ports, and a spool which is slidably inserted in the valve hole to switch flow paths among the ports;
    a driving portion for driving the spool, which comprises members listed below, namely, including a yoke comprising a cylindrical outer cylinder portion and a pair of inner cylinder portions, the inner cylinder portions being positioned in the interior of the outer cylinder portion so as to be opposed to each other via a constant gap concentrically with the outer cylinder portion and the yoke being formed with a first pole tooth and a second pole tooth, at least one exciting coil received in a space portion between the outer cylinder portion and the inner cylinder portions of the yoke, a cylindrical magnet holder made of non-magnetic body, which is received in a hollow portion surrounded by the first pole tooth and the second pole tooth of the yoke so as to be capable of displacing in an axial line direction of the yoke and which is coupled to the spool, and a cylindrical permanent magnet which is fitted on an outer periphery of the magnet holder so as to be opposed to the first pole tooth and the second pole tooth, where N pole and S pole are magnetized in a radial direction, and which has an axial length substantially spanning the pair of pole teeth;

a displacement sensor which is disposed in a hollow portion of the magnet holder so as to be positioned on a center axial line of the permanent magnet and which detects the displacement of the permanent magnet from change of flux density; and a control portion which compares a detection signal from the displacement sensor with a set value to control the driving portion on the basis of the deviation therebetween, thereby adjusting the degree of valve opening.

13. An air servo valve according to claim 12, wherein a sensor holder extends from a cover covering an end portion of the yoke towards the inside of the permanent magnet in a center axial line of the permanent magnet, and the displacement sensor is held by the sensor holder.

14. An air servo valve according to claim 12, wherein a plurality of the exciting coils having winding directions reverse to each other are provided, the exciting coils are arranged in parallel in an axial line direction of the yoke and the magnitudes of currents flowing in the respective exciting coils can be controlled individually.

15. An air servo valve according to claim 12, further comprising a current sensor for detecting current flowing in the exciting coil, wherein the coil current detected by the current sensor is fed back to the control portion so that a response delay of the coil current to the coil voltage is compensated for.

16. An air servo valve according to claim 12, further comprising a manual operating mechanism for switching the spool manually.

17. An air servo valve according to claim 16, wherein the manual operating mechanism comprises a handle attached to a casing so as to be rotationally operable about an axial line of the handle itself, a pin provided at a distal end of the handle in an eccentric state, and an engagement groove formed on the spool or the magnetic holder to be engaged with the pin.

18. An air servo valve according to claim 12, wherein the air servo valve is constituted such that the spool is held at a neutral position at a time of non-current flow to the exciting coil.

19. An air servo valve according to claim 18, wherein means for holding the spool at the neutral position is a magnetic saturation characteristic of the yoke, and the yoke is constituted so as not to be saturated by a magnetomotive force of the permanent of the permanent magnet.

20. An air servo valve according to claim 18, wherein means for holding the spool at the neutral position is return springs provided on both ends of the spool.

* * * * *